United States Patent
Hriljac et al.

(10) Patent No.: US 10,579,077 B2
(45) Date of Patent: Mar. 3, 2020

(54) METHOD AND SYSTEM FOR ADAPTIVE CONTROL FOR THERMOSTATS

(71) Applicant: Siemens Industry, Inc., Alpharetta, GA (US)

(72) Inventors: Jeffrey Hriljac, Port Barrington, IL (US); Shaun Finnerty, Chicago, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 15/572,123

(22) PCT Filed: May 6, 2016

(86) PCT No.: PCT/US2016/031160
§ 371 (c)(1),
(2) Date: Nov. 6, 2017

(87) PCT Pub. No.: WO2016/182891
PCT Pub. Date: Nov. 17, 2016

(65) Prior Publication Data
US 2018/0129232 A1     May 10, 2018

Related U.S. Application Data

(60) Provisional application No. 62/160,484, filed on May 12, 2015.

(51) Int. Cl.
*G05D 23/19*     (2006.01)
*F24F 11/46*     (2018.01)
(Continued)

(52) U.S. Cl.
CPC ...... *G05D 23/1904* (2013.01); *F24F 11/0001* (2013.01); *F24F 11/30* (2018.01);
(Continued)

(58) Field of Classification Search
CPC ............. G05D 23/1904; G05D 23/303; F24F 11/0001; F24F 11/30; F24F 11/46; F24F 11/52; F24F 11/56; F24F 11/89
See application file for complete search history.

(56) References Cited

U.S. PATENT DOCUMENTS 8,655,491 B2 *   2/2014   Hadzidedic ............. F24F 11/77
                                                      700/276
8,930,030 B2      1/2015   Bester et al.
(Continued)

OTHER PUBLICATIONS

PCT Search Report dated Jul. 20 2016, for PCT Application No. PCT/US2016/031160, 16 pages.

*Primary Examiner* — Marc E Norman (57) ABSTRACT

Systems and methods for improving energy efficiency in a heating, ventilation, and air conditioning (HVAC) system using a control device and a controllable component are provided. A climate control system for a facility includes a heating/venting/air-conditioning (HVAC) system, at least one controllable component configured to adjust environmental conditions automatically to minimize energy usage, a control panel, and a control device, wherein the control device displays data from the climate control system and includes a user interface through which a user can control the climate control system.

22 Claims, 10 Drawing Sheets

(51) Int. Cl.
- *F24F 11/30* (2018.01)
- *F24F 11/56* (2018.01)
- *F24F 11/52* (2018.01)
- *F24F 11/89* (2018.01)
- *F24F 11/00* (2018.01)
- *G05D 23/30* (2006.01)

(52) U.S. Cl.
CPC .............. *F24F 11/46* (2018.01); *F24F 11/52* (2018.01); *F24F 11/56* (2018.01); *F24F 11/89* (2018.01); *G05D 23/303* (2013.01)

(56) References Cited

U.S. PATENT DOCUMENTS

| | | | |
|---|---|---|---|
| 9,709,292 B2 * | 7/2017 | Steinberg | F24F 11/30 |
| 2010/0289643 A1 | 11/2010 | Trundle et al. | |
| 2013/0263034 A1 * | 10/2013 | Bruck | G05D 23/1904 |
| | | | 715/771 |
| 2014/0142773 A1 * | 5/2014 | Ling | G05B 13/02 |
| | | | 700/291 |
| 2014/0316581 A1 | 10/2014 | Fadell et al. | |
| 2014/0316584 A1 | 10/2014 | Matsuoka et al. | |
| 2015/0051741 A1 | 2/2015 | Bruck et al. | |

\* cited by examiner

METHOD AND SYSTEM FOR ADAPTIVE CONTROL FOR THERMOSTATS

RELATED APPLICATION

This application claims the benefit of PCT Application No. PCT/US2016/031160, filed May 6, 2016, which claims the benefit of the filing date of U.S. Provisional Patent Application 62/160,484, filed May 12, 2015, which is hereby incorporated by reference.

TECHNICAL FIELD

The present disclosure is directed, in general, to building systems and, more particularly, to methods and systems for controlling and improving energy efficiency in a heating, ventilation, and air conditioning (HVAC) system.

BACKGROUND OF THE DISCLOSURE

Building automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements, that are located in virtually every area of a facility. These building automation systems typically have one or more centralized control stations from which system data may be monitored and various aspects of system operation may be controlled and/or monitored.

To allow for monitoring and control of the dispersed control system elements, building automation systems often employ multi-level communication networks to communicate operational and/or alarm information between operating elements, such as sensors and actuators, and the centralized control station. One example of a building automation system is the Site Controls Controller, available from Siemens Industry, Inc. Building Technologies Division of Buffalo Grove, Ill. ("Siemens"). In this system, several control stations connected via an Ethernet or another type of network may be distributed throughout one or more building locations, each having the ability to monitor and control system operation.

Maintaining indoor air quality in commercial buildings requires that significant outside (fresh) air be supplied according to building codes and industry standards. Most retail sites have HVAC systems set up statically to serve maximum occupancy levels. As buildings are rarely fully occupied, the HVAC system wastes energy heating, cooling, and dehumidifying this excess amount of outside air. In many applications, the HVAC fan is programmed to run 24/7, regardless of heating or cooling need, or occupancy levels, further wasting energy.

Household and small-business HVAC systems have similar issues with inefficient heating, cooling, or ventilation when such operations are not needed by the homeowner or occupant.

SUMMARY OF THE DISCLOSURE

This disclosure describes a method and system for controlling improving energy efficiency in a heating, ventilation, and air conditioning (HVAC) system.

In accordance with another embodiment of the disclosure, a climate control system for a facility includes a heating/venting/air-conditioning (HVAC) system, at least one controllable component configured to adjust environmental conditions automatically to minimize energy usage, a control panel, and a control device, wherein the control device displays data from the climate control system and includes a user interface through which a user can control the climate control system. The at least one controllable component can include an adaptive thermostat.

In accordance with one embodiment of the disclosure, a method is performed by a climate control system having a heating/venting/air-conditioning (HVAC) system, and adaptive thermostat climate control system. The method includes monitoring at least one zone of a facility by the climate control system. The method includes performing adaptive control of an environmental condition of the at least one zone using the controllable component. The method includes transmitting status information to a control device. The method includes receiving control information from the control device. The method includes adjusting control of the temperature of the at least one zone according to the control information. The climate control system can be an adaptive thermostat climate control system that includes an adaptive thermostat as one of the controllable components. The environmental condition can include a temperature. Performing adaptive control can include adjusting heating or cooling setpoint temperatures automatically to minimize energy usage while maintaining occupant comfort Other technical features may be readily apparent to one skilled in the art from the following figures, descriptions, and claims.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Disclosed embodiments include systems and methods for adaptive HVAC thermostat controls, for use in building management systems, household systems, or other HVAC systems. Disclosed embodiments improve on the manual adjustment of thermostat heating and cooling setpoints. Disclosed embodiments can automatically adjust the heating and cooling setpoints based on environmental conditions and on user-selected factors via a remote device. Disclosed embodiments provide a remote "dashboard" view and control system by which a user can monitor and control an HVAC system.

In other systems, setpoints for heating or cooling are set by either manually inputting the setpoints or by manually adjusting the setpoints at the unit. Disclosed embodiments, by contrast, include systems and methods that incorporate an internal algorithm that use environmental conditions such as temperature and humidity to adjust setpoints and enable an operator to remotely view and control system status.

An HVAC system as described herein includes adaptive controls that determine the ideal comfort level for the space and adjust the setpoints on the thermostat accordingly. The adaptive controls may also be referred to herein using the term "green leaf." This adjustment in turn allows the building owners to reduce energy by not running their equipment as frequently. Disclosed embodiments can be implemented in systems such as those described in U.S. Pat. No. 8,930,030, incorporated by reference herein.

Various embodiments includes a "dashboard" control system that can be implemented as an "app" on a mobile device, in a "cloud" computing environment that can be accessed, for example, by an Internet browser, on a building controller, or in other ways. The dashboard control system can monitor HVAC status, energy usage, and other factors, and can remotely control the building control system components, including scheduling changes in setpoints and other parameters.

Figure 1:
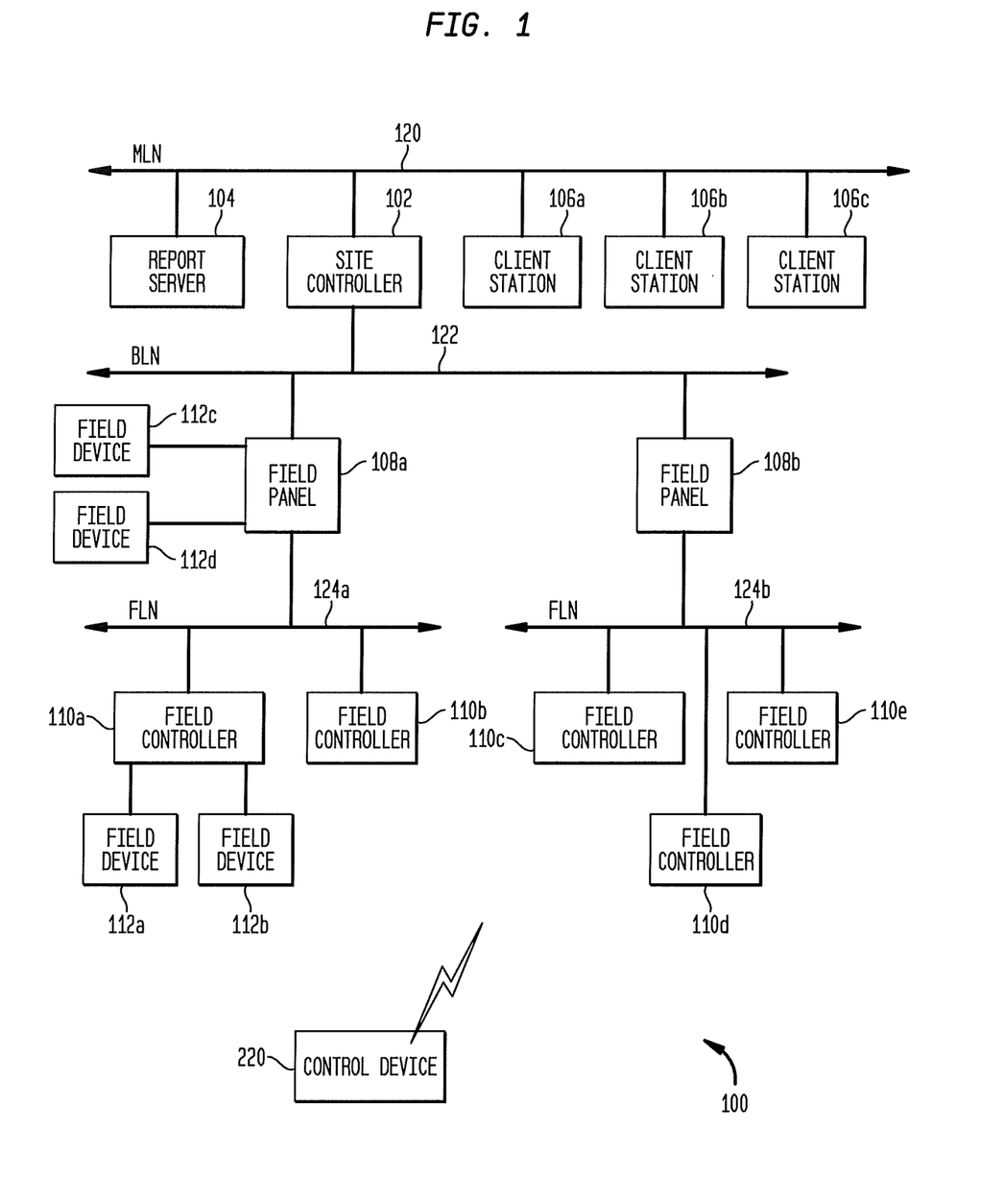
FIG. 1 illustrates a block diagram of a building automation system in accordance with the present disclosure.

FIG. 1 illustrates a block diagram of a building automation system 100 in which the energy efficiency of an HVAC system may be improved in accordance with the present disclosure. The building automation system 100 is an environmental control system configured to control at least one of a plurality of environmental parameters within a building, such as temperature, humidity, lighting and/or the like. For example, for a particular embodiment, the building automation system 100 may comprise the Site Controls Controller building automation system that allows the setting and/or changing of various controls of the system. While a brief description of the building automation system 100 is provided below, it will be understood that the building automation system 100 described herein is only one example of a particular form or configuration for a building automation system and that the system 100 may be implemented in any other suitable manner without departing from the scope of this disclosure.

For the illustrated embodiment, the building automation system 100 comprises a site controller 102, a report server 104, a plurality of client stations 106a-c, a plurality of field panels 108a-b, a plurality of field controllers 110a-e and a plurality of field devices 112a-d. Although illustrated with three client stations 106, two field panels 108, five field controllers 110 and four field devices 112, it will be understood that the system 100 may comprise any suitable number of any of these components 106, 108, 110 and 112 based on the particular configuration for a particular building.

The site controller 102, which may comprise a computer or a general-purpose processor, is configured to provide overall control and monitoring of the building automation system 100. The site controller 102 may operate as a data server that is capable of exchanging data with various elements of the system 100. As such, the site controller 102 may allow access to system data by various applications that may be executed on the site controller 102 or other supervisory computers (not shown in FIG. 1).

For example, the site controller 102 may be capable of communicating with other supervisory computers, Internet gateways, or other gateways to other external devices, as well as to additional network managers (which in turn may connect to more subsystems via additional low-level data networks) by way of a management level network (MLN) 120. The site controller 102 may use the MLN 120 to exchange system data with other elements on the MLN 120, such as the report server 104 and one or more client stations 106. The report server 104 may be configured to generate reports regarding various aspects of the system 100. Each client station 106 may be configured to communicate with the system 100 to receive information from and/or provide modifications to the system 100 in any suitable manner. The MLN 120 may comprise an Ethernet or similar wired network and may employ TCP/IP, BACnet and/or other protocols that support high-speed data communications.

The site controller 102 may also be configured to accept modifications and/or other input from a user. This may be accomplished via a user interface of the site controller 102 or any other user interface that may be configured to communicate with the site controller 102 through any suitable network or connection, such as by the control device 220 illustrated in FIG. 2. The user interface may include a keyboard, touchscreen, mouse, or other interface components. The site controller 102 is configured to, among other things, affect or change operational data of the field panels 108, as well as other components of the system 100. The site controller 102 may use a building level network (BLN) 122 to exchange system data with other elements on the BLN 122, such as the field panels 108.

Each field panel 108 may comprise a general-purpose processor and is configured to use the data and/or instructions from the site controller 102 to provide control of its one or more corresponding field controllers 110. While the site controller 102 is generally used to make modifications to one or more of the various components of the building automation system 100, a field panel 108 may also be able to provide certain modifications to one or more parameters of the system 100. Each field panel 108 may use a field level network (FLN) 124 to exchange system data with other elements on the FLN 124, such as a subset of the field controllers 110 coupled to the field panel 108.

Each field controller 110 may comprise a general-purpose processor and may correspond to one of a plurality of localized, standard building automation subsystems, such as building space temperature control subsystems, lighting control subsystems, or the like. For a particular embodiment, the field controllers 110 may comprise the model TEC (Terminal Equipment Controller) available from Siemens. However, it will be understood that the field controllers 110 may comprise any other suitable type of controllers without departing from the scope of the present invention.

To carry out control of its corresponding subsystem, each field controller 110 may be coupled to one or more field devices 112. Each field controller 110 is configured to use the data and/or instructions from its corresponding field panel 108 to provide control of its one or more corresponding field devices 112. For some embodiments, some of the field controllers 110 may control their subsystems based on sensed conditions and desired set point conditions. For these embodiments, these field controllers 110 may be configured to control the operation of one or more field devices 112 to attempt to bring the sensed condition to the desired set point condition. It is noted that in the system 100, information from the field devices 112 may be shared between the field controllers 110, the field panels 108, the site controller 102 and/or any other elements on or connected to the system 100.

In order to facilitate the sharing of information between subsystems, groups of subsystems may be organized into an FLN 124. For example, the subsystems corresponding to the field controllers 110a and 110b may be coupled to the field panel 108a to form the FLN 124a. The FLNs 124a and 124b may each comprise a low-level data network that may employ any suitable proprietary or open protocol.

Each field device 112 may be configured to measure, monitor and/or control various parameters of the building automation system 100. Examples of field devices 112 include lights, thermostats, temperature sensors, fans, damper actuators, heaters, chillers, alarms, HVAC devices, and numerous other types of field devices. The field devices 112 may be capable of receiving control signals from and/or sending signals to the field controllers 110, the field panels 108 and/or the site controller 102 of the building automation system 100. Accordingly, the building automation system 100 is able to control various aspects of building operation by controlling and monitoring the field devices 112. In particular embodiments, one or more of the field devices 112 is an controllable components such as an adaptive thermostat configured to perform processes as described herein.

As illustrated in FIG. 1, any of the field panels 108, such as the field panel 108a, may be directly coupled to one or more field devices 112, such as the field devices 112c and 112d. For this type of embodiment, the field panel 108a may be configured to provide direct control of the field devices 112c and 112d instead of control via one of the field controllers 110a or 110b. Therefore, for this embodiment, the functions of a field controller 110 for one or more particular subsystems may be provided by a field panel 108 without the need for a field controller 110.

Building automation system 100 can include a control device 220 configured to communicate over a wired or wireless network with one or more of the elements depicted in FIG. 1 to perform processes as described herein. Control device 220 can be a dedicated climate control device, a building controller, a server system, or can be implemented using a portable device such as a smartphone, tablet computer, laptop computer, or otherwise, and includes such elements as a processor or controller, memory, a transceiver, a network interface, a display, a user input device such as a touchscreen, keyboard, mouse, trackpad, or otherwise, and other components. The control device can be implemented as an "app" executing on the portable device.

Figure 2:
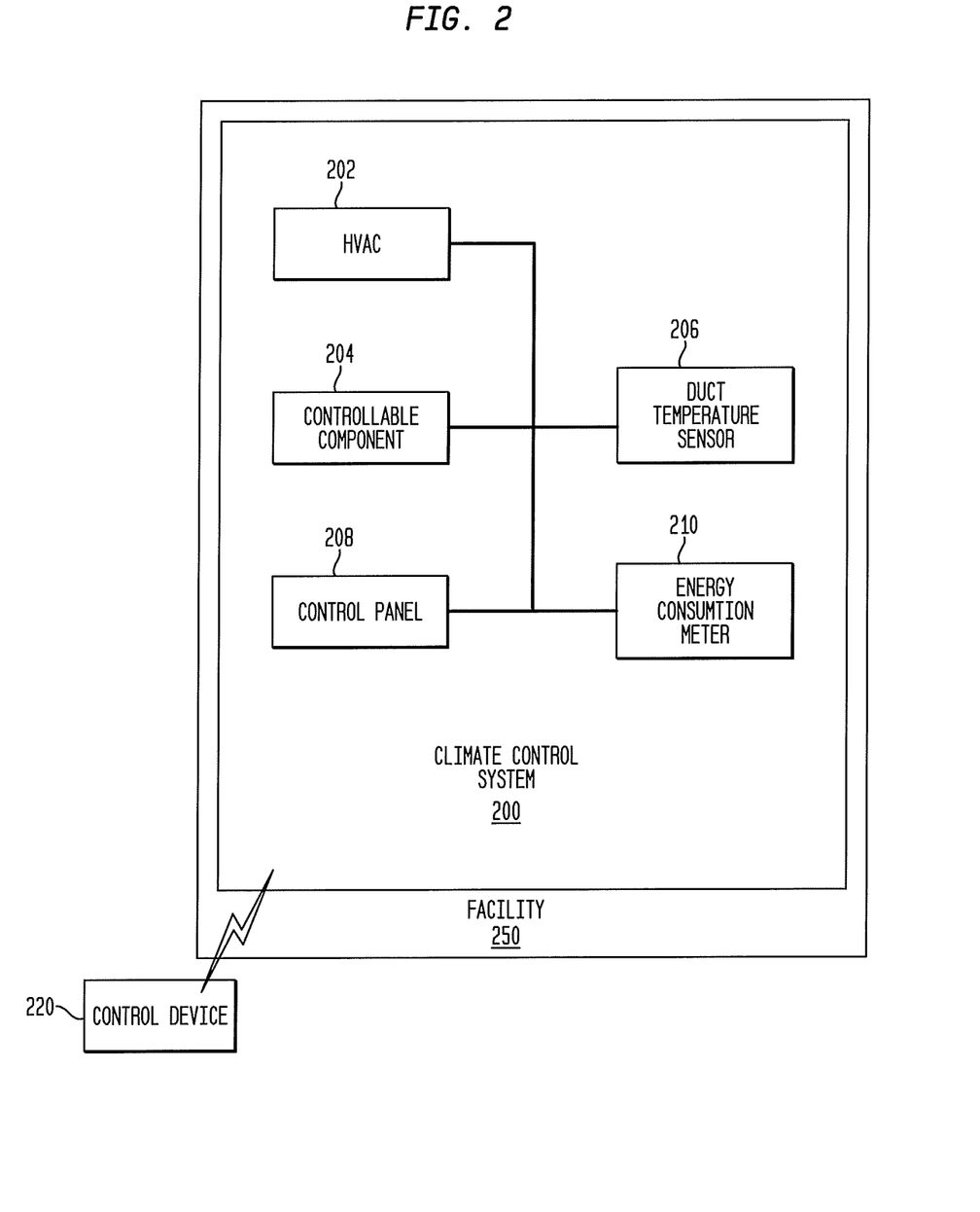
FIG. 2 illustrates at least a portion of a climate control system that is capable of improving the energy efficiency of an HVAC system using an adaptive thermostat system and methods in accordance with the present disclosure.

FIG. 2 illustrates at least a portion of a climate control system 200 and related methods that are capable of improving the energy efficiency of an HVAC system using a controllable component such as an adaptive thermostat in accordance with the present disclosure, including remote monitoring and control functions. In this example, the climate control system 200 includes HVAC system 202 connected to be controlled by an controllable component 204 implemented as an adaptive thermostat. The household system 200 also includes a duct temperature sensor 206, a control panel 208, and an energy consumption meter 210. Any of these elements can include elements such as a controller and a memory, and can be configured to perform one or more of the processes as described herein. Various embodiments can include other sensors and controls, including temperature, lighting, occupancy, humidity, or other sensors, and including venting, heating, cooling, humidifying, dehumidifying, lighting, daylighting, or other controls, any of which can function as controllable components as described herein. Climate control system 200 can be implemented in a household, business, or any other building, generically referred to as a "facility" 250.

Climate control system 200 can include a control device 220 configured to communicate over a wired or wireless network with one or more controllable components 204 such as a thermostat or control panel 208 to perform functions as described herein. Control device 220 can be a dedicated climate control device, such as a building controller or otherwise that can be accessed, for example, by a touch panel, a cloud server system that can be accessed, for example, by an Internet browser or other Web user interface, or can be implemented using a portable device such as a smartphone, tablet computer, laptop computer, or otherwise, and includes such elements as a processor or controller, memory, a transceiver, a network interface, a display, a user input device such as a touchscreen, keyboard, mouse, trackpad, or otherwise, and other components. The control device can be implemented as an "app" executing on the portable device.

While only a single one of each element is shown in this example, various implementations of climate control system 200 can include multiple ones of each element depicted. Further, the implementation of controllable component 204 as an adaptive thermostat is exemplary and intended to represent any controllable component that can be controlled as described herein.

Disclosed embodiments can include an automated dashboard and simple end user interface. Disclosed embodiments can integrate multiple heating/cooling units and can also include lighting control and metering.

According to disclosed embodiments, setpoints can be automatically determined based on environmental conditions and user input. The system process uses data such as geographic location, outdoor air temperature and humidity to increase or decrease the heating and cooling setpoints for optimum energy savings while still retaining customer comfort levels. All climate and energy control processes and data can be viewed and controlled by a dashboard on a control device as disclosed herein.

Each setpoint can be scheduled for occupied or unoccupied times either on a daily or weekly basis and combined with traditional ways of setpoint adjustment.

The user is able to either have the setpoints completely adjusted for them, such as in accordance with a combination of comfort level and energy savings, aggressive energy savings and less comfort, or aggressive comfort and less energy savings.

Figure 3:
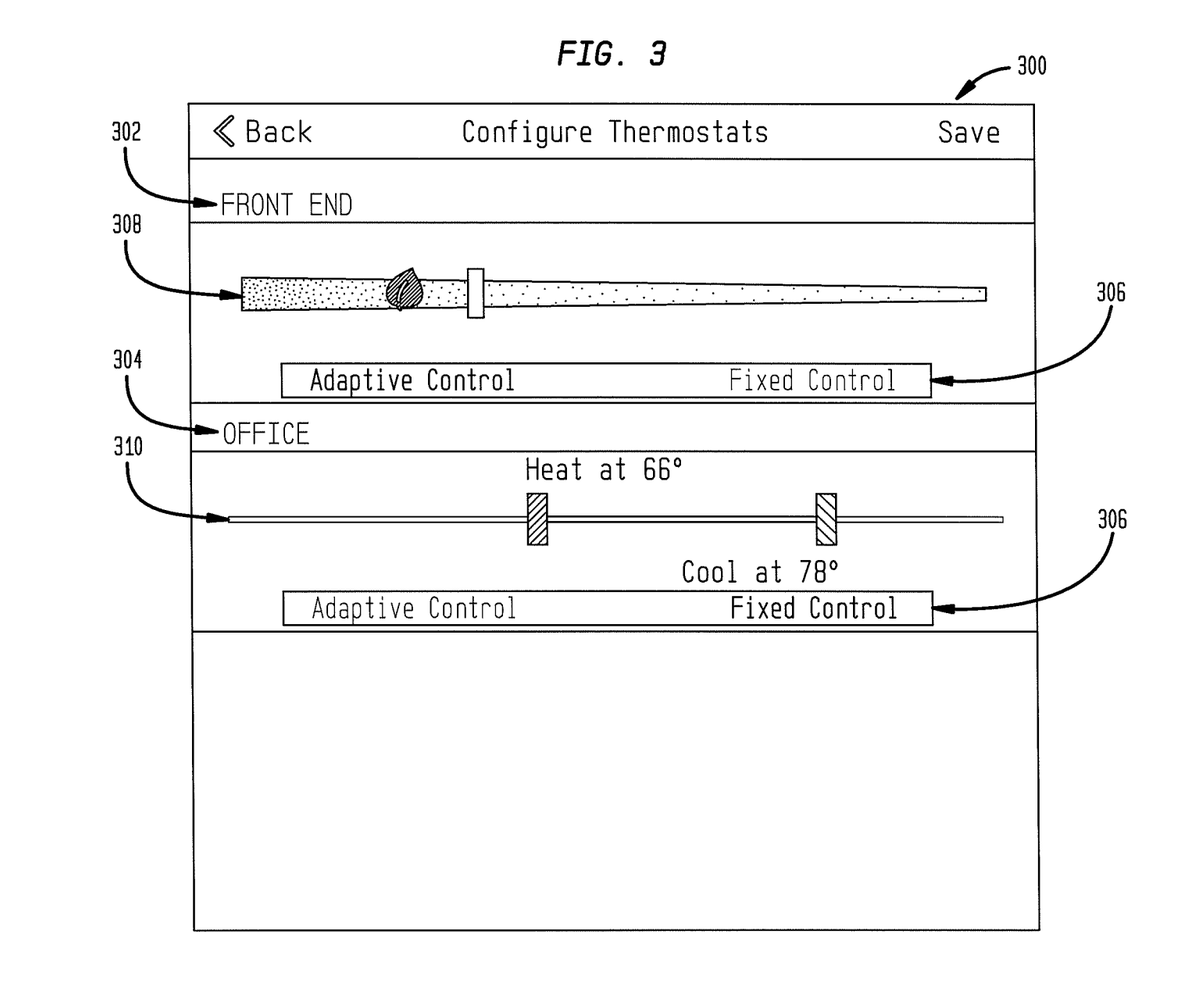
FIG. 3 illustrates an example of a configuration interface in accordance with disclosed embodiments.

The system processes can be controlled by a mobile application or by a user dashboard, in various embodiments. In other embodiments, the system processes can be controlled by a cloud server system, FIG. 3 illustrates an example of a configuration interface 300 in accordance with disclosed embodiments that can be displayed by a control device 220 to control, for example, a controllable component 204 of climate control system 200. This interface can be manipulated by a user, for example, by using a touchscreen of a mobile device, and so it can be used to control controllable component 204 or climate control system 200 from any remote location as long is there is a wired, wireless, or combination network connection to climate control system 200.

In this example, configuration interface 300 includes "slider" controls that can be used to control one or more controllable components 204, also represented as adaptive thermostats in this example. In this example, two adaptive thermostats are being controlled for different zones of the facility, where a first zone 302 is labeled the "Front End" and a second zone 304 is labeled the "Office."

Each zone has a mode selector 306 that allows a user to toggle the zone between an adaptive control mode, in which case the controllable component 204 or climate control system 200 manages temperatures of the zone, or a fixed control mode, in which the user manually sets heating and cooling setpoints.

In this example, mode selector 306 of first zone 302 is set to "adaptive control" model. In this mode, adaptive slider control 308 is used to determine how aggressively the controllable component 204 or climate control system 200 should attempt to save energy. When the slider is moved to the left to the more "green" end, controllable component 204 or climate control system 200 will attempt to minimize energy usage, adjusting heating or cooling setpoint temperatures automatically while maintaining occupant comfort, even if some occupant comfort is sacrificed. On the other hand, when the slider is moved to the right to the least "green" end, controllable component 204 or climate control system 200 will attempt to save energy by adjusting heating or cooling setpoint temperatures automatically, but will still attempt to maintain optimal comfort levels for occupants.

In this example, mode selector 306 of second zone 304 is set to "fixed control" model. In this mode, setpoint slider control 310 is used to manually set heating and cooling setpoints for that zone. Controllable component 204 or climate control system 200 will then operate the climate control system 200 according to these setpoints.

Figure 4A:
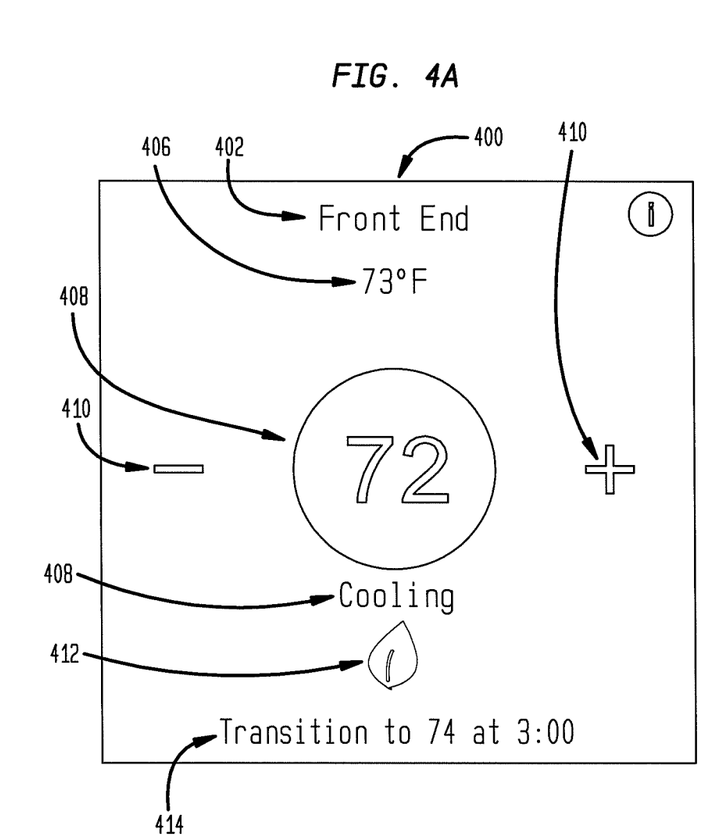
FIGS. 4A and 4B illustrate an example of thermostat monitoring and control in a mobile dashboard user interface in accordance with disclosed embodiments.
Figure 4B:
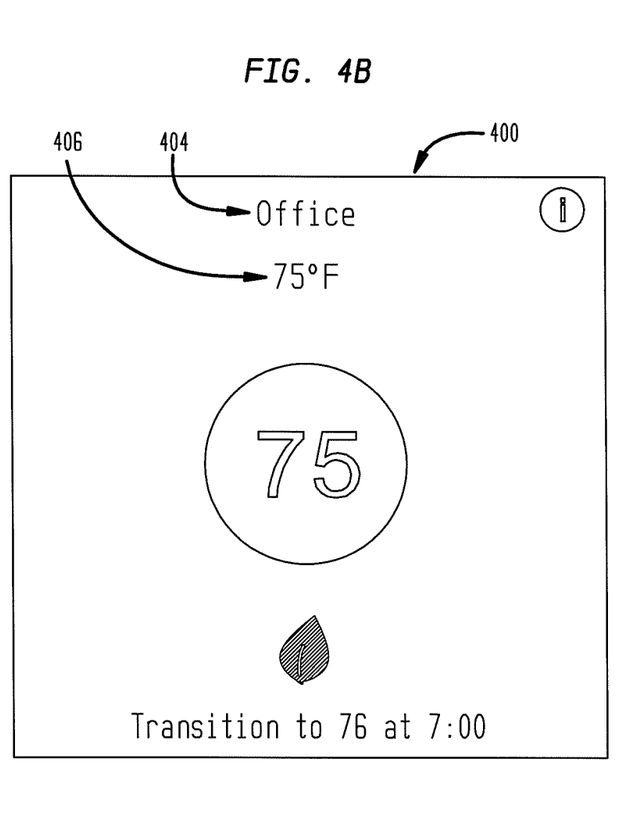

FIGS. 4A and 4B illustrate an example of thermostat monitoring and control in a mobile dashboard user interface 400 in accordance with disclosed embodiments, such as with controllable component 204. In this example, there are two zones being controlled, a first zone 402 ("front end") and a second zone 404 ("office"). The two zones can be displayed at the same or at different times in user interface 400.

In each zone, the current temperature 406 for that zone is displayed. The current setpoint 408 is displayed, as well as the current status 408 of the climate control system 200 (cooling, in this example). The setpoint area in which setpoint 408 is displayed can be color-coded to indicate system status; for example, the setpoint area can be displayed in blue to indicate a current cooling status or in red to indicate a current heating status.

This example also shows setpoint controls 410, which enable a user to use a touch input to manually raise or lower the displayed setpoint for each zone. This interface also shows an example of another mode selector 412 that can be used for the user to toggle the system between adaptive control mode and fixed control mode. In fixed control mode, the setpoint controls 410 are displayed. In adaptive control mode, the mode selector 412 can be displayed in a different color (for example, in green) to show that the system is in adaptive control mode, and the setpoint controls 410 are not displayed.

In some systems, setpoints are fixed by the user and setup with schedules to transition throughout the day. If a setpoint change is desired, the user can manually change the setpoints. Disclosed embodiments allow automatic setpoint adjustment without the need of human interaction or overrides, for example in adaptive control mode.

Mobile dashboard user interface 400 can also show and be used to adjust scheduled transitions 414, such as a scheduled transition to a 74° setpoint at 3:00 PM.

Figure 5:
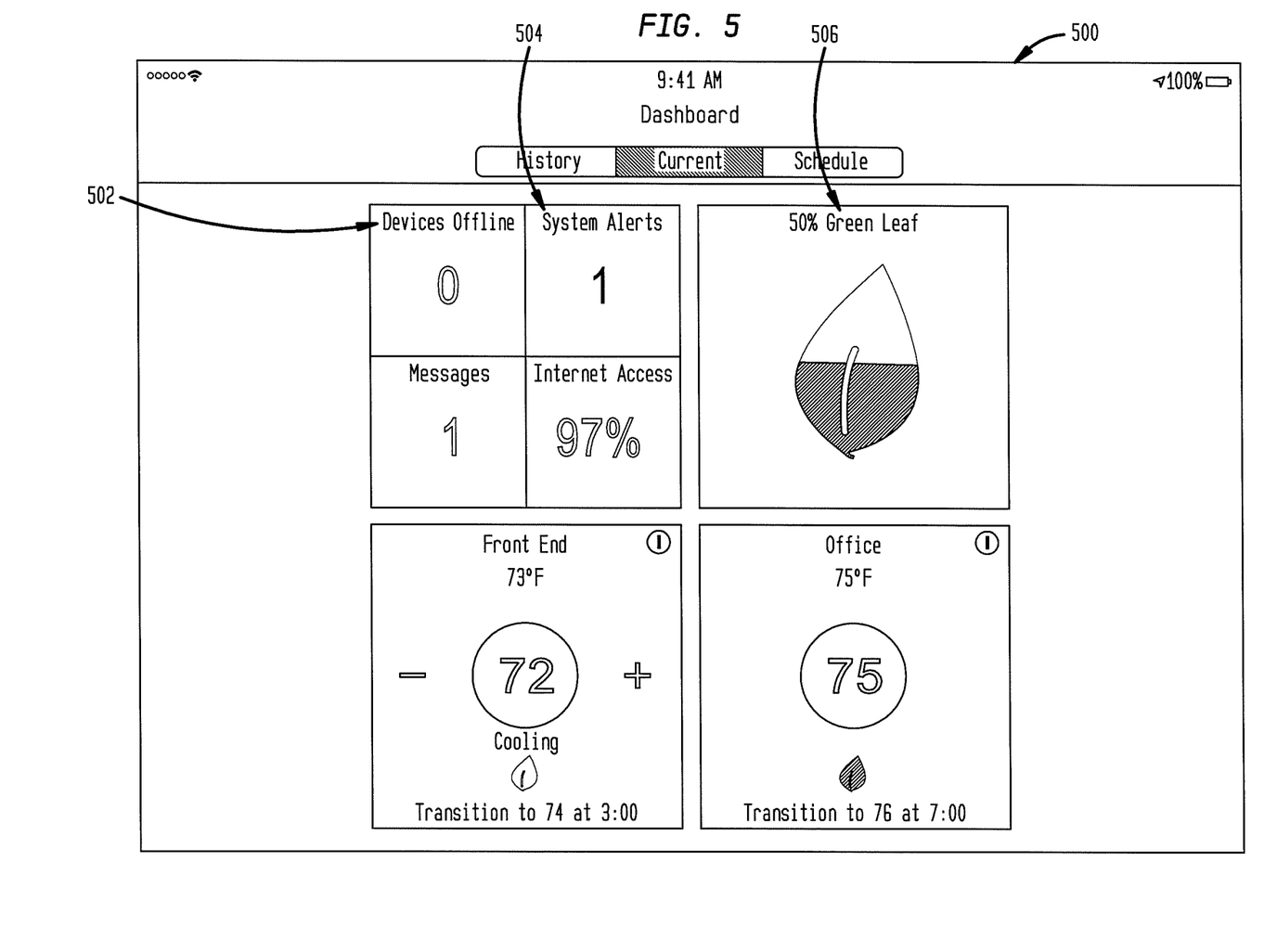
FIG. 5 illustrates another example of a mobile dashboard user interface on a control device as disclosed herein.

FIG. 5 illustrates another example of a mobile dashboard user interface 500 on a control device as disclosed herein. This view shows such information as what devices are on/offline, how many alerts or messages are waiting, how many systems are using adaptive control for environmental optimization; current temperatures, operations, settings, and other information for each thermostat, etc.

In this example, portions of the mobile dashboard user interface 500 illustrates similar features as shown in mobile dashboard user interface 400. This example also shows other indicators, such as the number of devices offline 502, the number of system alerts 504, and the percent of the system or zones operating under "green leaf" adaptive control 506.

Figure 6:
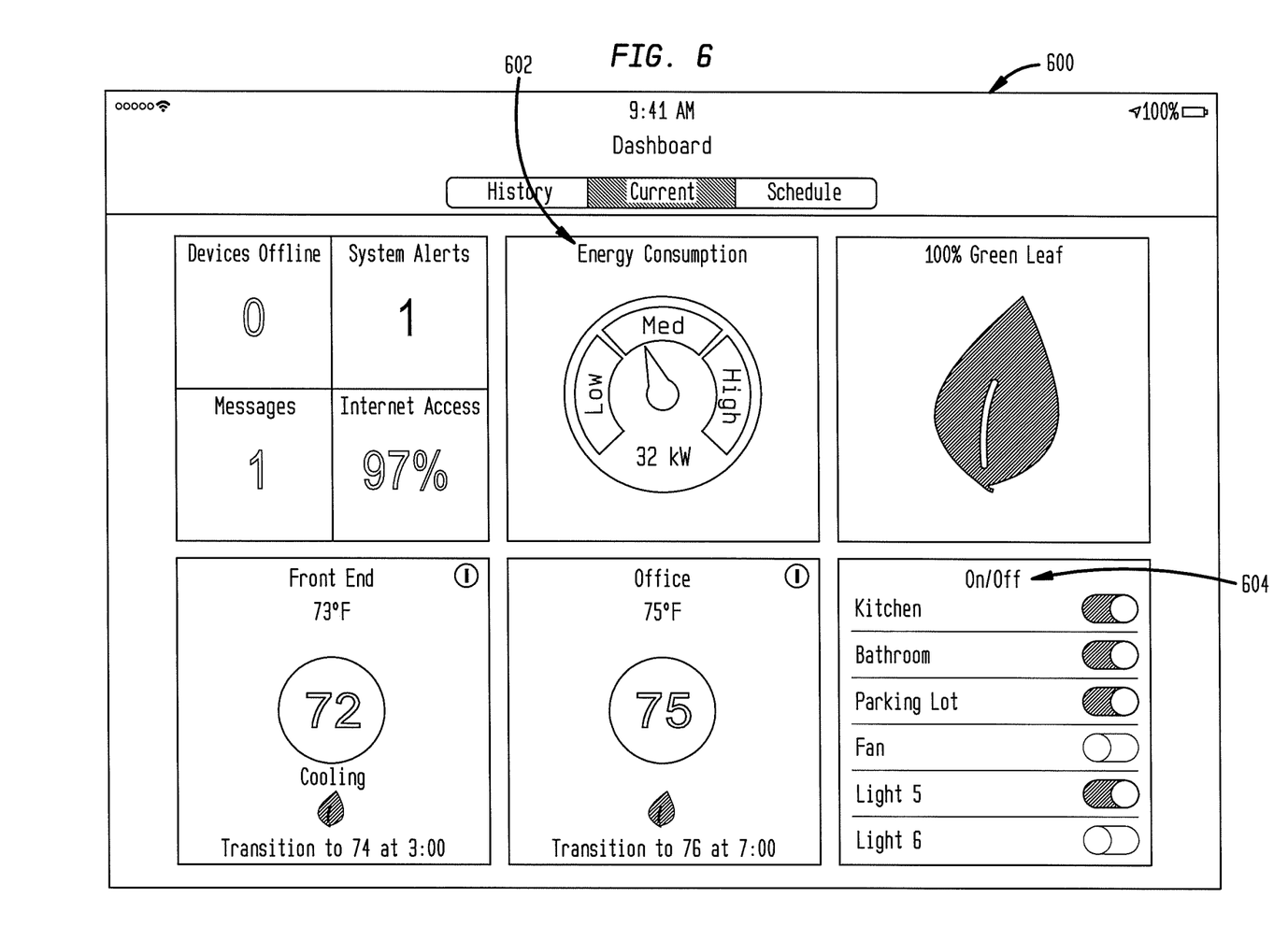
FIG. 6 illustrates another example of a mobile dashboard user interface on a control device as disclosed herein.

FIG. 6 illustrates another example of a mobile dashboard user interface 600 on a control device as disclosed herein. In this example, portions of the mobile dashboard user interface 600 illustrates similar features as shown in mobile dashboard user interface 400 and mobile dashboard user interface 500.

In this example, mobile dashboard user interface 600 also displays energy consumption 602. Mobile dashboard user interface 600 also displays device controls 604, by which the user can remotely turn on or off various devises such as lights, fans, and others.

Figure 7:
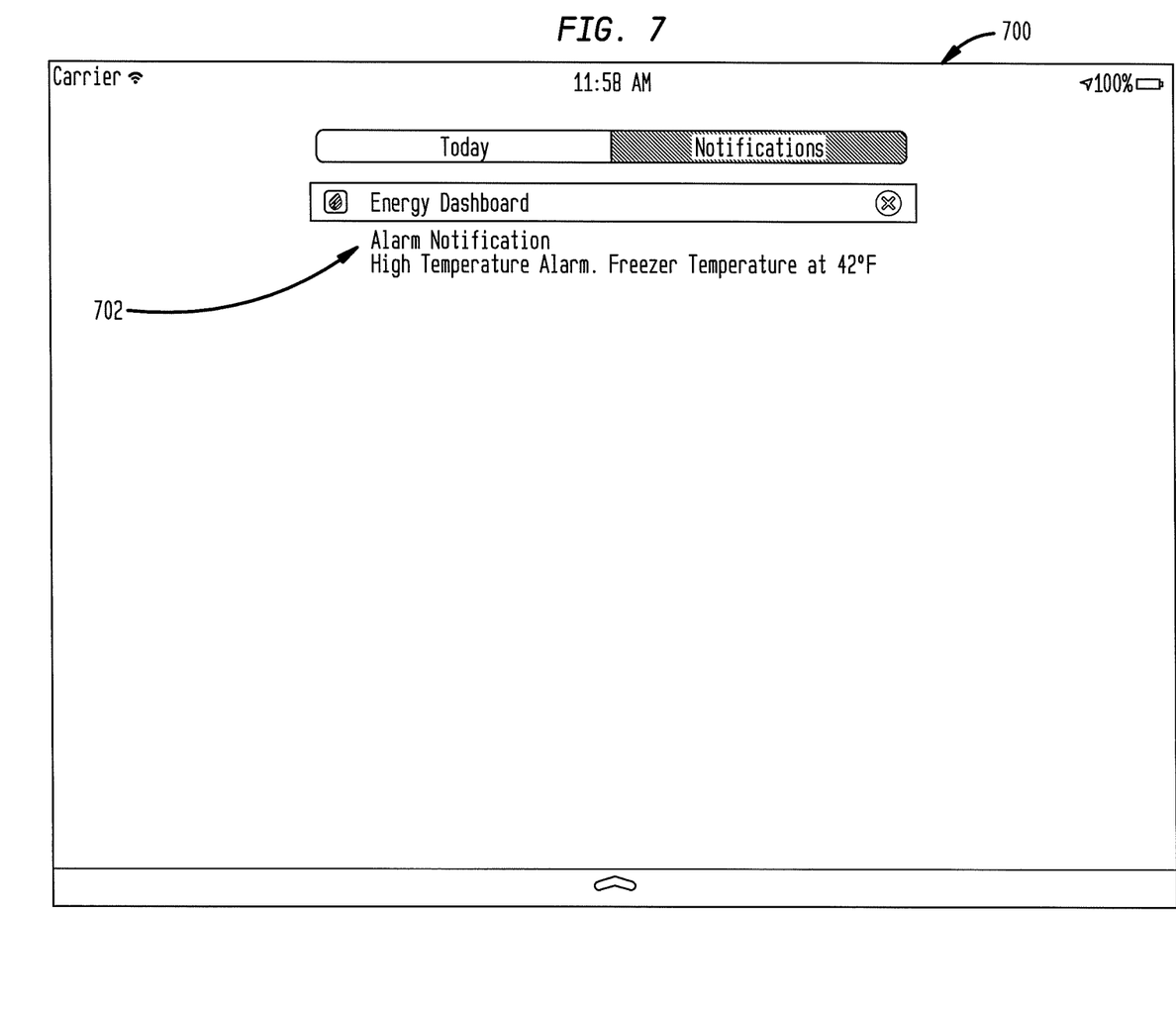
FIG. 7 illustrates an example of a mobile dashboard user interface that includes a notification displayed on a control device as disclosed herein.

FIG. 7 illustrates an example of a mobile dashboard user interface 700 that includes a notification 702 such as a smart alarm or alert that can be detected and displayed on a control device as disclosed herein. The notification notifies a user of a detected fault in the climate control system, such as a temperature that is higher or lower than predetermined thresholds.

Figure 8:
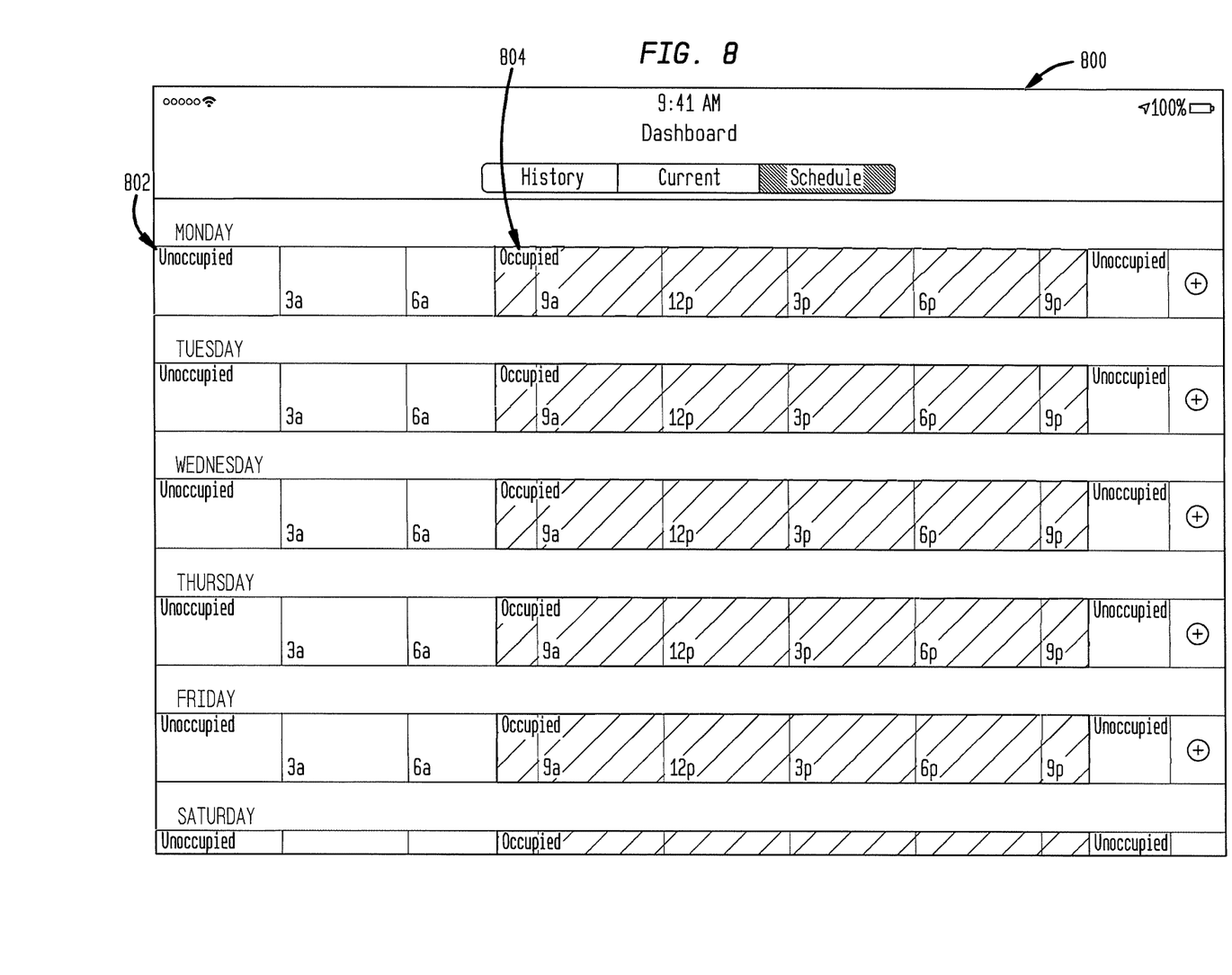
FIG. 8 illustrates an example of a scheduling interface on a control device as described herein.

FIG. 8 illustrates an example of a scheduling interface 800 on a control device as described herein, that can display and control the operations schedules for one or more elements of the climate control system. Scheduling interface 800 can indicate, for example, when each zone is unoccupied 802 or occupied 804.

Figure 9:
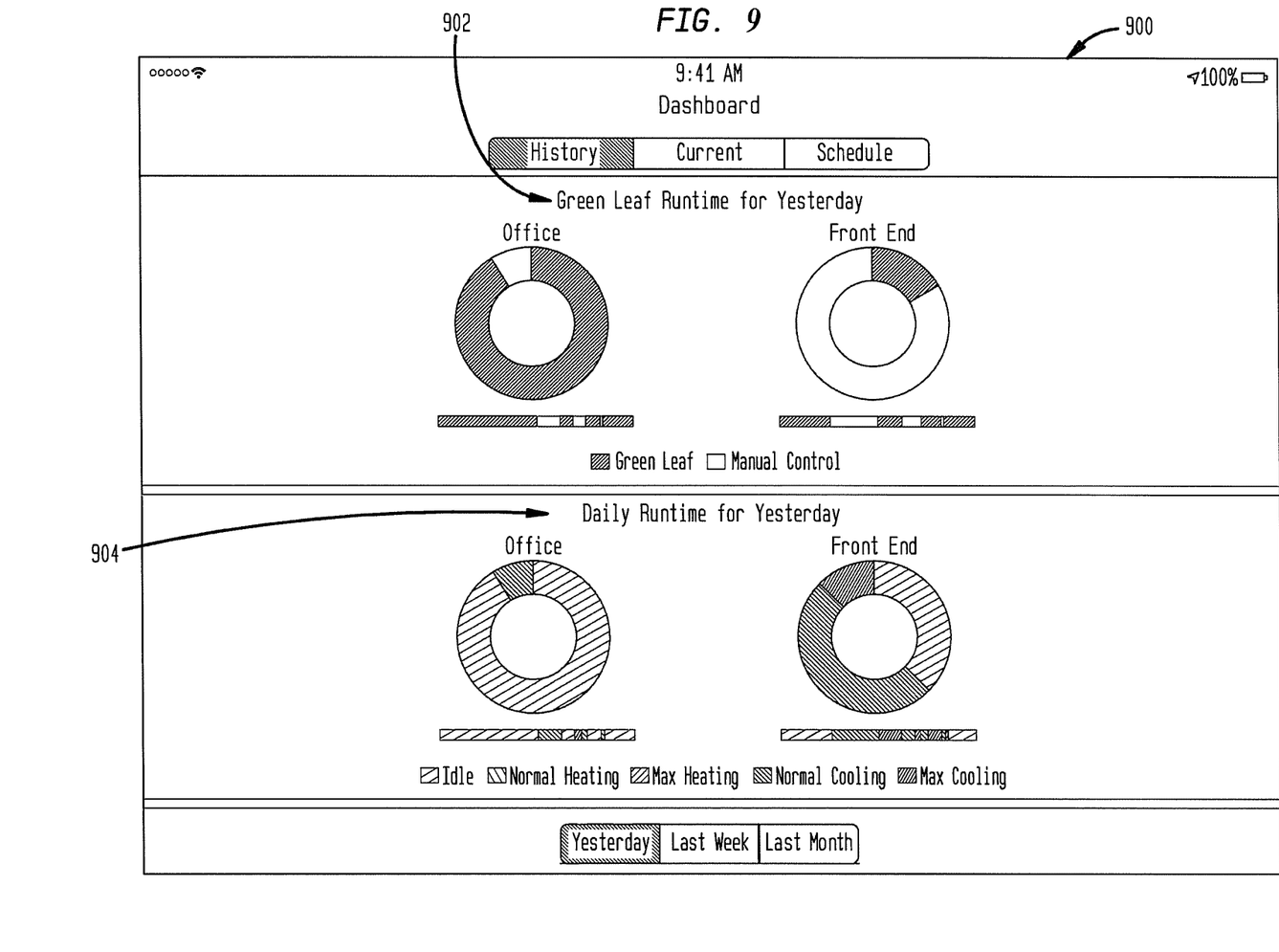
FIG. 9 illustrates an example of a history interface on a control device as described herein.

FIG. 9 illustrates an example of a history interface 900 on a control device as described herein, that can display the historical settings, operations, and statuses for one or more elements of the climate control system. In this example, history interface 900 shows the adaptive control runtime 902 for the previous day for a plurality of zones, in a graphical format, so that a user can easily see how much time, proportionally, the system spent in an adaptive control mode and how much time was spend under manual control. History interface 900 also shows the system status runtime 903 for the previous day for a plurality of zones, in a graphical format, so that a user can easily see how much time, proportionally, the system spent various statuses, such as idle, normal heating, maximum heating, normal cooling, or maximum cooling.

Figure 10:
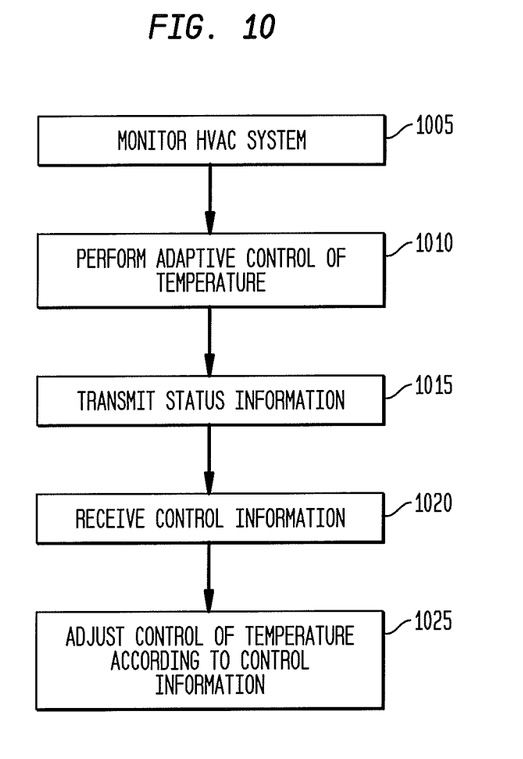
FIG. 10 depicts a flowchart of a process in accordance with disclosed embodiments.

FIG. 10 depicts a flowchart of a process in accordance with disclosed embodiments that may be performed, for example, by a climate control system as control device as described herein. While the flowchart itself describes an example of control using an adaptive thermostat, the process is not limited to that example.

The climate control system, including controllable components such as a heating/venting/air-conditioning (HVAC) system, an adaptive thermostat, or lighting controls monitors the temperature or other environmental conditions of at least one zone of a facility (1005). The temperature can be monitored by the adaptive thermostat.

The climate control system performs adaptive control of the environmental conditions at least one zone using at least one of the controllable components, such as adjusting heating or cooling setpoint temperatures automatically to minimize energy usage while maintaining occupant comfort (1010). The environmental conditions can include temperature, venting, lighting or others. The adaptive control can be performed using any of the controllable components, such as the heating/venting/air-conditioning (HVAC) system, the adaptive thermostat, or the lighting controls.

The climate control system transmits status information to a control device (1015). The status information can be sent from a control panel of the climate control system, from the adaptive thermostat, or from another device or controllable component as described herein, and can be transmitted via a wired connection, a wireless connection (including wifi or cellular connections), or a combination of these. The control device can be implemented, for example, as an app executing on a portable device or a smartphone. The control device can display one or more user interfaces that includes any of the status information.

The status information can include any of the information described herein as displayed in a user interface, including one or more of what devices are online or offline, how many alerts or messages are waiting, how many systems are using adaptive control; current temperatures, operations, settings, and other information for the adaptive thermostat. The status information can include historical settings, operations, and statuses for one or more elements of the climate control system.

The climate control system receives control information from the control device (1020). The control information can be received by the control panel of the climate control system, from the adaptive thermostat, or by another device as described herein, and can be received via a wired connection, a wireless connection (including wifi or cellular connections), or a combination of these.

The control information can include any of the information described herein that can be manipulated via the described user interfaces, including control information for lighting of the climate control system, adjustments to scheduled setpoints for the adaptive thermostat, and others.

The climate control system thereafter adjusts control of the environmental condition of the at least one zone according to the control information (1025).

Those of skill in the art will recognize that, unless specifically indicated or required by the sequence of operations, certain steps in the processes described above may be omitted, combined, performed concurrently or sequentially, or performed in a different order. Processes and elements of different exemplary embodiments above can be combined within the scope of this disclosure.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable media include: nonvolatile, hard-coded type media such as read-only memories (ROMs) or electrically erasable programmable read-only memories (EEPROMs), and user-recordable type media such as floppy disks, hard disk drives and compact disc read-only memories (CD-ROMs) or digital versatile discs (DVDs).

While this disclosure has described certain embodiments and generally associated methods, alterations and permutations of these embodiments and methods will be apparent to those skilled in the art. Accordingly, the examples of various embodiments described above do not define or constrain this disclosure. Other changes, substitutions, and alterations are also possible without departing from the spirit and scope of this disclosure, as defined by the following claims.

What is claimed is:

1. A climate control system for a facility, comprising:
   at least one controllable component configured to adjust heating or cooling setpoint temperatures manually or automatically, wherein adjusting automatically is based on environmental conditions to manage energy usage and occupant comfort; and
   a control device, wherein the control device displays data from the climate control system and includes a user interface through which a user can control the climate control system, the user interface selecting a selection from a group consisting of:
a fixed control mode to display setpoint controls at the control device for selecting one or more setpoint temperatures manually; and
an adaptive control mode to display a plurality of adaptive control settings at the control device including aggressive energy savings and less comfort, aggressive comfort and less energy savings, and a combination of comfort level and energy savings, wherein the control device adjusts heating or cooling setpoint temperatures automatically in response to selecting one of the adaptive control settings.

2. The climate control system of claim 1, wherein the control device is implemented as an app executing on a portable device.

3. The climate control system of claim 1, wherein the controllable component is an adaptive thermostat.

4. The climate control system of claim 1, wherein the control device displays a dashboard that includes one or more of what devices are online or offline, how many alerts or messages are waiting, how many systems are using adaptive control, current temperatures, operations, settings, and other information for the controllable component.

5. The climate control system of claim 1, wherein the control device receives status information from the controllable component via a wireless connection.

6. The climate control system of claim 1, wherein the control device transmits control information to the controllable component via a wireless connection.

7. The climate control system of claim 1, wherein the control device displays a history interface that include historical settings, operations, and statuses for one or more elements of the climate control system.

8. The climate control system of claim 1, wherein the control device displays a user interface mobile dashboard user interface that includes a notification that notifies a user of a detected fault in the climate control system.

9. The climate control system of claim 1, wherein the climate control system includes at least one light that can be controlled via the control device.

10. The climate control system of claim 1, wherein the control device displays and adjusts scheduled setpoints for the controllable component.

11. The climate control system of claim 1, wherein the setpoint controls are not displayed for the adaptive control mode.

12. The climate control system of claim 1, wherein the user interface shows and is used to adjust scheduled transitions.

13. A method performed by a climate control system having at least one controllable component, comprising:
monitoring at least one zone of a facility by the climate control system;
performing manual or adaptive control of the at least one zone using the controllable component, wherein performing the adaptive control includes adjusting heating or cooling setpoint temperatures automatically based on environmental conditions to manage energy usage and occupant comfort;
transmitting status information to a control device;
receiving control information from the control device, the control information including a selection selected from a group consisting of:
a fixed control mode to display setpoint controls at the control device for selecting one or more setpoint temperatures manually; or
an adaptive control mode to display a plurality of adaptive control settings at the control device including aggressive energy savings and less comfort, aggressive comfort and less energy savings, and a combination of comfort level and energy savings, wherein the control device adjusts heating or cooling setpoint temperatures automatically in response to selecting one of the adaptive control settings; and
adjusting control of the environmental condition of the at least one zone according to the control information.

14. The method of claim 13, wherein the control device is implemented as an app executing on a portable device.

15. The method of claim 13, the at least one controllable component is an adaptive thermostat, and the environmental condition includes a temperature.

16. The method of claim 13, wherein the status information includes one or more of what devices are online or offline, how many alerts or messages are waiting, how many systems are using adaptive control; current temperatures, operations, settings, and other information for the adaptive thermostat.

17. The method of claim 13, wherein the status information is transmitted from the controllable component via a wireless connection.

18. The method of claim 13, wherein the control information is received by the controllable component via a wireless connection.

19. The method of claim 13, wherein the status information includes historical settings, operations, and statuses for one or more elements of the climate control system.

20. The method of claim 13, wherein the status information includes a notification that notifies a user of a detected fault in the climate control system.

21. The method of claim 13, wherein the control information includes control information for lighting of the climate control system.

22. The method of claim 13, wherein the control information includes adjustments to scheduled setpoints for an adaptive thermostat.

* * * * *